(12) United States Patent
Carniato et al.

(10) Patent No.: US 10,815,066 B2
(45) Date of Patent: Oct. 27, 2020

(54) SYSTEM AND METHOD FOR CORRECTING CONVEYOR BELT MISALIGNMENT

(71) Applicant: SYNCRUDE CANADA LTD. in trust for the owners of the Syncrude Project as such owners exist now and in the future, Fort McMurray (CA)

(72) Inventors: Michael Carniato, Sherwood Park (CA); Dan Wolfe, Edmonton (CA); Mark Polak, Edmonton (CA); Yuxiang (Isaac) Wu, Edmonton (CA); Soon Won Moon, Edmonton (CA)

(73) Assignee: SYNCRUDE CANADA LTD., Fort McMurray (CA), in trust for the owners of the Syncrude Project as such owners exist now and in the future ( * ) Notice: Subject to any disclaimer, the term of this patent is extended or adjusted under 35 U.S.C. 154(b) by 0 days.

(21) Appl. No.: 16/379,369

(22) Filed: Apr. 9, 2019

(65) Prior Publication Data

US 2019/0322460 A1   Oct. 24, 2019

Related U.S. Application Data

(60) Provisional application No. 62/655,638, filed on Apr. 10, 2018.

(51) Int. Cl.
    *B65G 39/16*   (2006.01)
(52) U.S. Cl.
    CPC ................ *B65G 39/16* (2013.01)

(58) Field of Classification Search
    CPC ....................................... B65G 39/16
    See application file for complete search history.

(56) References Cited

U.S. PATENT DOCUMENTS

3,593,841 A  *  7/1971  Leow ............... B65G 39/16
                                                198/806
7,967,129 B2    6/2011  Swinderman
                 (Continued)

FOREIGN PATENT DOCUMENTS

CA    2519709 A1   10/2004
CA    2716796 C     7/2009
               (Continued)

*Primary Examiner* — Gene O Crawford
*Assistant Examiner* — Lester Rushin, III
(74) *Attorney, Agent, or Firm* — Bennett Jones LLP

(57) ABSTRACT

A system for correcting transverse misalignment of a conveyor belt relative to a supporting pulley, includes a frame is pivotally attached to a stationary member. A guide surface engages the frame to guide pivoting of the frame about the pivot point simultaneously about a vertical axis and a longitudinally aligned axis. Idler rollers rotatably mounted on the frame define a rolling contact surface for the conveyor belt, which is concavely-shaped in a transversely-extending vertical plane. The pivoting of the frame causes the surface to impart a combined transverse pushing effect, torsional steering effect, and torsional tiling effect on the conveyor belt. An actuator applies a force to pivot the frame about the axis. A computer determines an amount of the misalignment based on a signal from a sensor, and automatically controls the actuator to pivot the frame, depending on the determined amount of the misalignment.

20 Claims, 9 Drawing Sheets

(56) References Cited

U.S. PATENT DOCUMENTS

| | | | |
|---|---|---|---|
| 9,033,135 B1 | 5/2015 | Sharp | |
| 9,145,262 B2 * | 9/2015 | Eagleson | ............... B65G 39/16 |
| 9,145,263 B2 | 9/2015 | Ellis | |
| 9,238,552 B2 * | 1/2016 | Hozumi | ................. G03G 15/1615 |
| 9,611,101 B1 * | 4/2017 | Wolfe | ................... B65G 39/16 |
| 10,264,728 B2 * | 4/2019 | Brimeyer | ............... A01D 61/02 |
| 10,315,859 B1 * | 6/2019 | Zhao | ...................... B65G 47/31 |
| 10,435,186 B2 * | 10/2019 | Capitani | ........... B29C 66/53461 |
| 2009/0084661 A1 * | 4/2009 | Graswinckel | ........ G03G 15/755 |
| | | | 198/807 |
| 2016/0332819 A1 | 11/2016 | O'Brien | |

FOREIGN PATENT DOCUMENTS

| | | |
|---|---|---|
| JP | 09315549 A | 12/1997 |
| WO | 1997047538 A1 | 12/1997 |
| WO | 19990029600 A1 | 6/1999 |
| WO | 2004085292 A1 | 10/2004 |
| WO | 2009092130 A1 | 7/2009 |
| WO | 2010033892 A1 | 9/2009 |
| WO | 2011143270 A1 | 11/2011 |
| WO | 2014008517 A1 | 1/2014 |
| WO | 2015157838 A1 | 10/2015 |
| WO | 2017091242 A1 | 6/2017 |

\* cited by examiner

SYSTEM AND METHOD FOR CORRECTING CONVEYOR BELT MISALIGNMENT

FIELD OF THE INVENTION

The present invention relates to systems and methods for correcting conveyor belt misalignment.

BACKGROUND OF THE INVENTION

Conveyor belt systems are used in a variety of industrial operations to transport bulk materials, including oil sand ores. Conveyor belts may become misaligned from their supporting pulleys and idler rollers due to a variety of factors: impact forces of the bulk material being dumped on the conveyor belt; uneven weight distribution of bulk materials on the conveyor belt; non-steady state loading of bulk materials on the conveyor belt; damage to or fouling of conveyor belt system components; poor quality of conveyor belt splices; uneven tension across the width of the conveyor belt; and temperature changes in the operating environment. Conveyor belt misalignment accelerates wears of the conveyor belt, and can damage other components of the conveyor belt system. Further, the downtime for inspecting and fixing misaligned conveyor belts can result in significant productivity loss.

Technologies have been developed to address the problem of conveyor belt alignment. One solution is to configure an idler roller to pivot about a vertical axis relative to a support, in response to drag forces resulting from transverse movement of the belt, so that the idler roller applies a torque to steer the conveyor belt back to a central path; see: WO 97/47538 A1 (Cumberlege et al.); WO 2004/085292 A1 (Cumberlege); WO 2010/033892 A1 (Swinderman); WO 2011/143270 A1 (Devries); WO 2014/008517 A1 (Ellis); and WO 2015/157838 A1 (Sharp). Another solution provides a tracking disc for an idler roller, where the tracking disc has upstanding flanges that abut the conveyor belt when it moves transversely; see WO 99/29600 A1 (Chapman). Another solution provides a pair of rollers that define V-shaped grooves to receive opposite edges of a conveyor belt, and urge the conveyor belt transversely back towards a central path; see US 2016/0332819 A1 (O'Brien). Another solution provides a concavely shaped idler roller between two planate idler rollers; see WO 2017/091242 A1 (Wolfe et al.). Another solution provides a system that uses sensors to detect conveyor belt misalignment, and in response to a detected irregularity of the conveyor belt, generates an alert, or stops the conveyor belt; see WO 2009/092130 A1 (Warner). Notwithstanding, there remains a need in the art for improved technologies to correct conveyor belt misalignment.

SUMMARY OF THE INVENTION

The present invention relates to correcting a misalignment of a conveyor belt relative to a pulley supporting the conveyor belt. It will be understood that the conveyor belt travels in a horizontal "longitudinal" direction relative to a stationary member, and the misalignment occurs in a horizontal "transverse" direction perpendicular to the longitudinal direction, and relative to a pulley that supports the conveyor belt. In general, the present invention enables or involves pivoting a concavely-shaped rolling contact surface for a conveyor belt. More particularly, the contact surface is pivoted about a pivot point, simultaneously about a vertical axis to produce a "yaw" component of rotation and a longitudinally aligned axis to produce a "roll" component of rotation. The combined "yaw" and "roll" components of rotation of the contact surface impart a combined transverse pushing effect, torsional steering effect, and torsional tilting effect on the conveyor belt. These effects may act in concert with each other to correct the misalignment of the conveyor belt more effectively than any of these effects in isolation.

In one aspect, the present invention is a system that includes a rigid frame, at least one guide surface, and a plurality of idler rollers. The rigid frame is pivotally attached at a pivot point to the stationary member. The guide surface, directly or indirectly, engages the frame to guide pivoting of the frame about the pivot point simultaneously about a vertical axis and a longitudinally aligned axis. The plurality of idler rollers are rotatably mounted on the frame and spaced apart from the pivot point. The plurality of idler rollers collectively define a rolling contact surface for the conveyor belt, wherein the rolling contact surface is concavely-shaped in a transversely-extending vertical plane.

In an embodiment of the system, the pivot point is adjustable in respect to its vertical position relative to the conveyor belt.

In an embodiment of the system, the at least one guide surface comprises a pair of transversely spaced apart, vertically inclined guide surfaces. The guide surfaces may be adjustable in respect to their vertical position relative to the conveyor belt. The guide surfaces may be removably attached to a guide member assembly so as to be interchangeable with replacement guide surfaces having a different geometry (e.g., in respect to one or a combination of angle of vertical inclination, contour, or position) such that the guide surface and the replacement guide surface guide pivoting of the frame about the pivot point in different paths. The system may further comprises a pair of transversely spaced apart rolling elements rotatably mounted to the rigid frame, wherein guide surfaces indirectly engage the frame to guide pivoting of the frame via rolling contact of the rolling elements with the guide surfaces. Each of the rolling elements may comprise a ball or a wheel.

In an embodiment of the system, the system further comprises an actuator for pivoting the frame about the pivot point. The actuator may comprise a hydraulic actuator.

In an embodiment of the system, the system further comprises a sensor for monitoring the misalignment. The sensor may comprise an electro-optical sensor. The sensor may monitor the position of an edge of the conveyor belt.

In such embodiments, the system further comprises a computer operatively connected to the sensor and to the actuator, and configured to determine an amount of the misalignment based on a signal from the sensor, and automatically control the actuator to pivot the frame about the pivot point, depending on the amount of the determined amount of the misalignment. The computer may be configured to continuously control the actuator in real-time, depending on the determined amount of the misalignment detected by the sensor at an instance in time. The computer may be configured to periodically control the actuator, depending on an average of the amount of misalignment detected by the sensor at a plurality of instances in time, in a time period.

In another aspect, the present invention is a method for correcting a misalignment of a conveyor belt. The method includes the steps of: placing a rolling contact surface in contact with the conveyor belt, wherein the rolling contact surface is collectively defined by a plurality of idler rollers, and wherein the rolling contact surface is concavely-shaped in a transversely-extending vertical plane; and when the rolling contact surface is in contact with the conveyor belt and the conveyor belt is travelling in the longitudinal direction, pivoting the rolling contact surface, relative to the stationary member, about a pivot point spaced apart from the rolling contact surface, simultaneously about a vertical axis and a longitudinally aligned axis.

In embodiments of the method, the method further comprises adjusting one or a combination of a vertical position of the pivot point relative to the conveyor belt, or an angle of inclination of the rolling contact surface relative to the conveyor belt.

In embodiments of the method, the pivoting step is performed using an actuator to apply a force to a frame on which the plurality of idler rollers are rotatably mounted. The actuator may comprise a hydraulic actuator.

In embodiments of the method, the method further comprises using a sensor to monitor the misalignment. The sensor may comprise an electro-optical sensor. The sensor may monitor the misalignment by monitoring the position of an edge of the conveyor belt.

In embodiments of the method, in the pivoting step, the actuator is automatically controlled by a computer operatively connected to the sensor and to the actuator, depending on the amount of the misalignment detected by the sensor. The computer may be configured to continuously control the actuator in real-time, and configured to determine an amount of the misalignment based on a signal from the sensor, and to control the actuator to pivot the frame about the pivot point depending on the determined amount of the misalignment. The computer may be configured to periodically control the actuator, depending on an average of the determined amount of the misalignment at a plurality of instances in time, in a time period.

DESCRIPTION OF THE PREFERRED EMBODIMENT

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

First Embodiment

Figure 1:
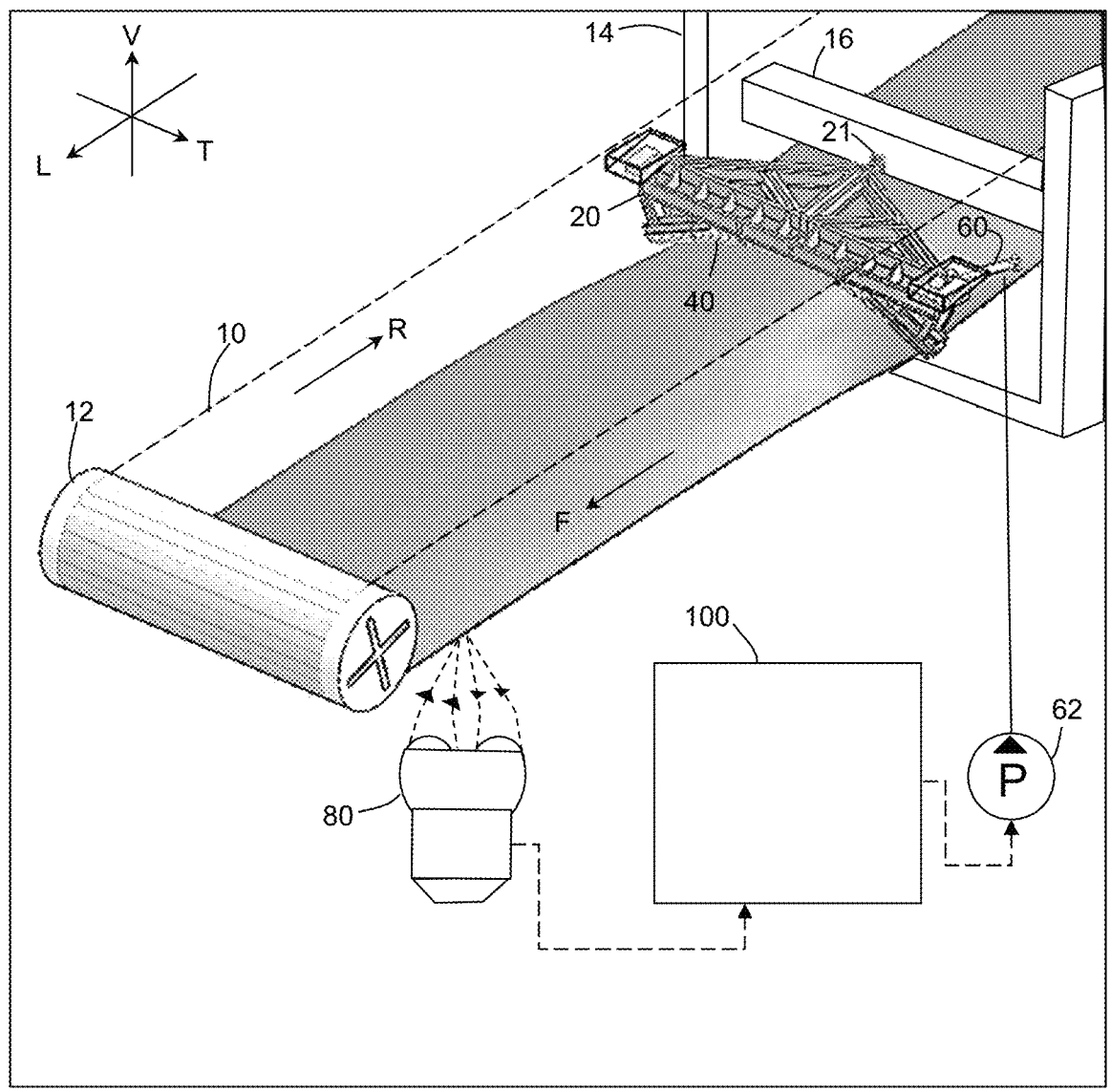
FIG. 1 is a perspective view of a first embodiment of a system of the present invention, together with a conveyor belt installation.
Figure 2:
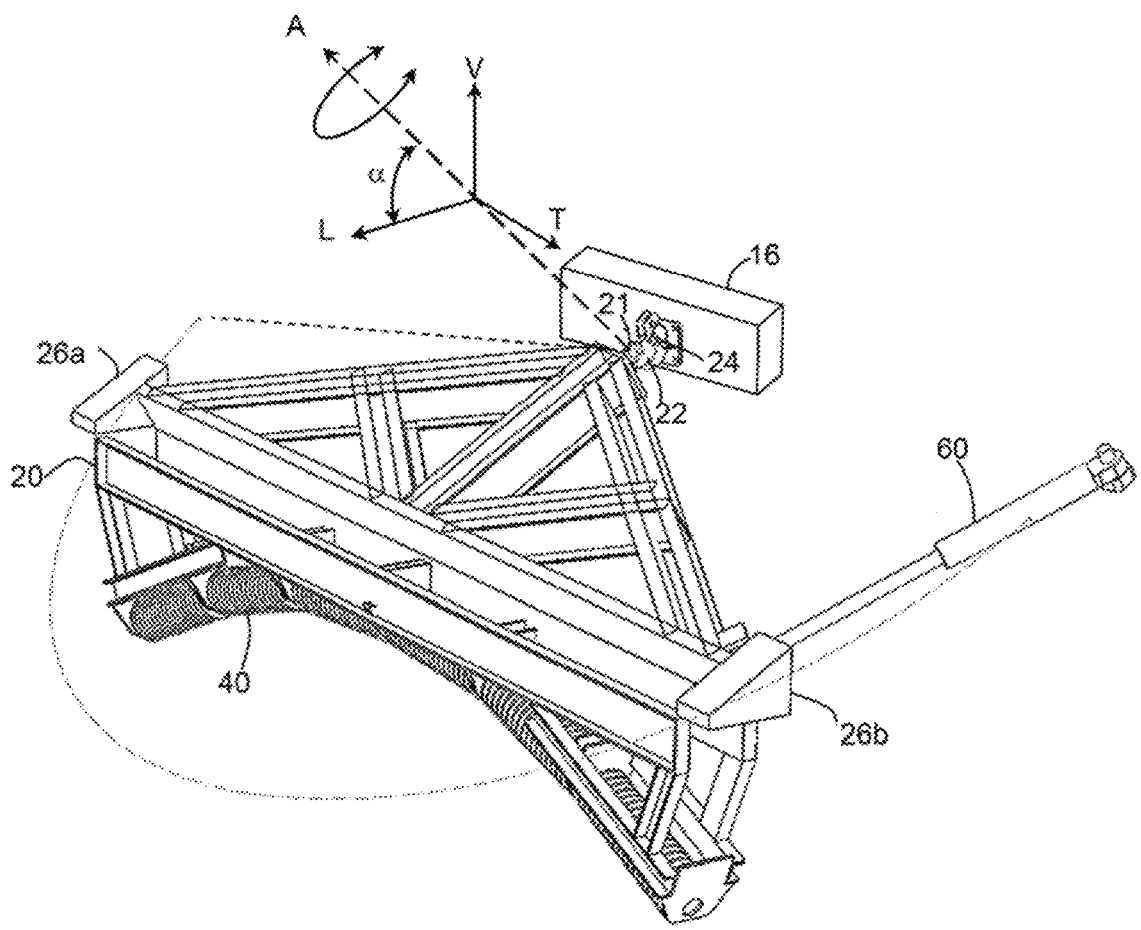
FIG. 2 is a perspective view of an embodiment of an apparatus of the system shown in FIG. 1, in isolation from the conveyor belt installation.

FIGS. 1 to 4B show a first embodiment of a system of the present invention, together with a conveyor belt installation. For convenient description, FIG. 1 shows three mutually orthogonal references axes corresponding to a horizontal longitudinal direction (L), a horizontal transverse direction (T), and a vertical direction (V). These directions are used only to refer to relative spatial relationships between parts of the system. As such, the horizontal directions (L) and (T) may not be exactly horizontal, and the vertical direction (V) may not be exactly vertical in implementation of the invention.

Figure 3A:
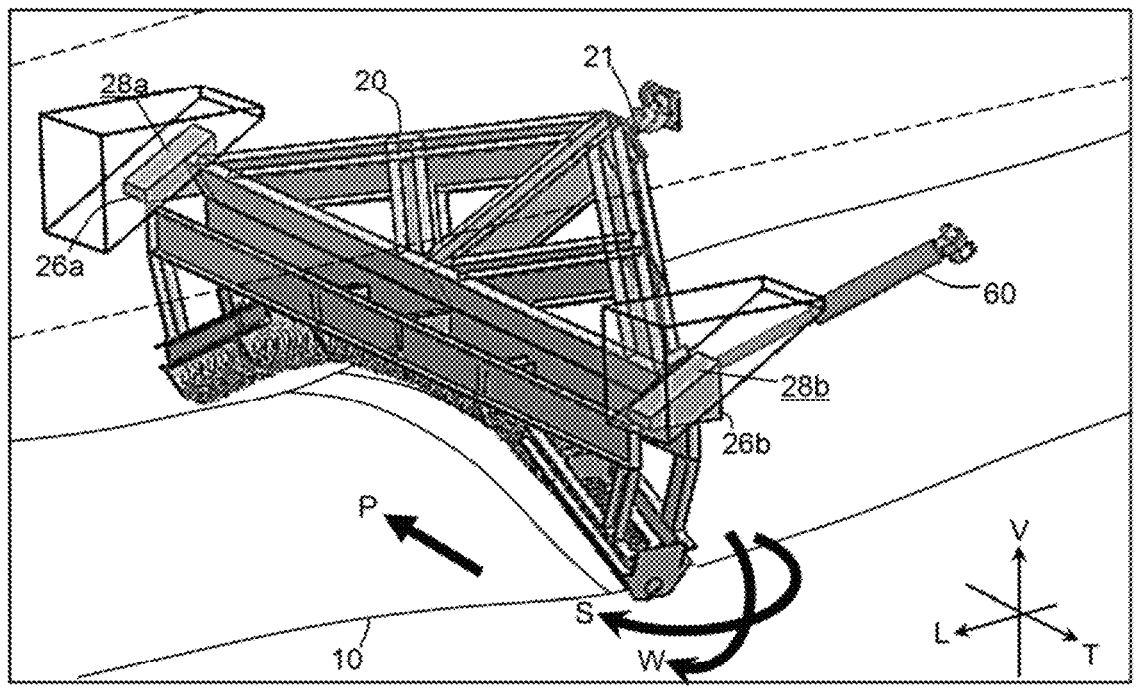
FIG. 3A is a perspective views of the apparatus shown in FIG. 2, in relation to the conveyor belt installation.
Figure 3B:
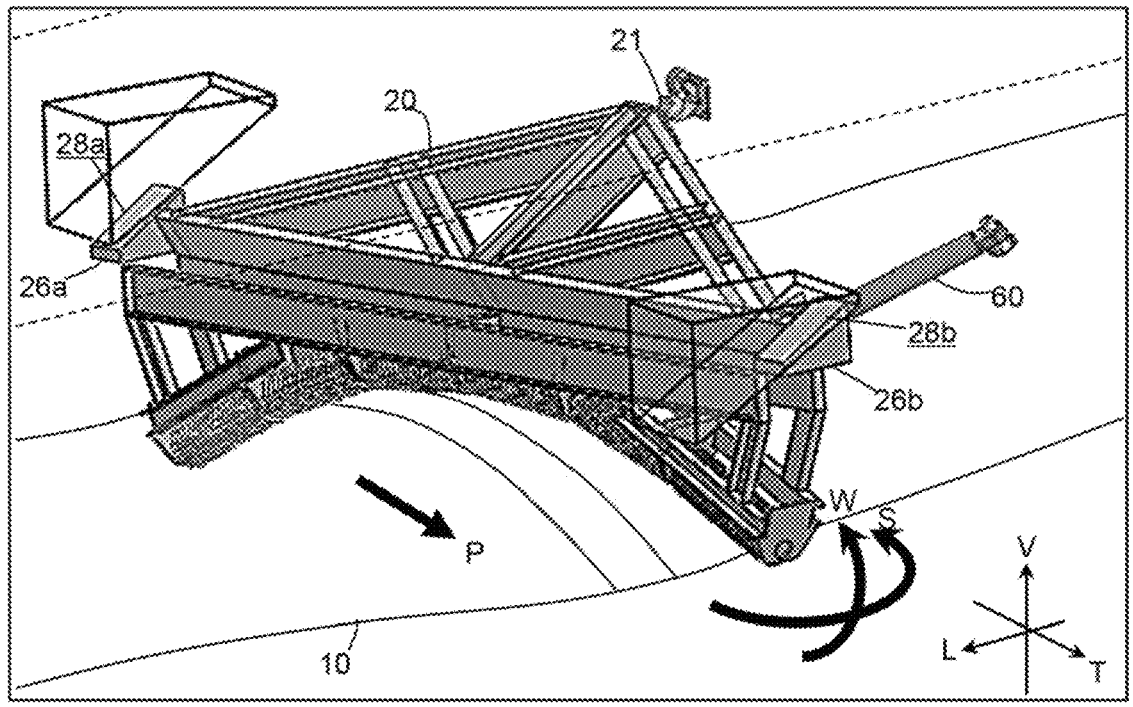
FIG. 3B is a perspective view of the apparatus shown in FIG. 3A, when in a different position than shown in FIG. 3A.

Referring to FIG. 1, the conveyor belt installation by itself is conventional, and includes a conveyor belt (10) supported and driven by an end pulley (12) relative to a support frame (14). In an exemplary use, the conveyor belt installation is used for transporting mined oil sands ore, but the system is not limited to any particular use. The forward run of the conveyor belt (10) (i.e., the conveyor belt portion above the end pulley (12)) travels in the longitudinally rearward direction (denoted by arrow (R)), while the return run of the conveyor belt (10) (i.e., the conveyor belt portion below the end pulley (12)) travels in the longitudinally forward direction (denoted by arrow (F)). In FIGS. 1, 3A and 3B, the forward run of the conveyor belt (10) is shown as transparent with dashed lines, while in FIGS. 4A and 4B, the return run of the conveyor belt (10) is shown as transparent with dashed lines, for visibility of the other parts. In use, the conveyor belt (10) may become misaligned by moving transversely relative to the end pulley (12). This transverse misalignment may be attributed to one or more causes, which are immaterial to the present invention. An object of the present invention is to correct the transverse misalignment of the conveyor belt (10) while the conveyor belt (10) is operating.

In general, the first embodiment of the system includes a frame (20), a plurality of idler rollers (40), an actuator (60), a sensor (80), and a computer (100), as are later described in greater detail. In the embodiment of the system shown in FIG. 1, the frame (20) is disposed vertically between the forward and return runs of the conveyor belt (10), and the idler rollers (40) are positioned to impart corrective forces to the top surface of the return run of the conveyor belt (10). The conveyor belt (10) is under tension that is sufficient to impart a reactive upward force to the idler rollers (40), and thereby partially support the weight of the frame (20) and the rollers (40).

Frame.

A purpose of the frame (20) is to provide a structure for mounting the idler rollers (40). In the embodiment shown in FIG. 2, the frame (20) is robustly constructed for use with the conveyor belt installation used to transport large masses of mined oil sands ore. In this embodiment, the frame (20) includes steel members having I-shaped cross-sections that are attached to each other to form a substantially triangular-shaped truss. At the bottom of the truss, the frame (20) includes a curved axle for supporting the idler rollers (40). The axle extends transversely, substantially between the lower vertices of the triangular truss. In other embodiments, the frame (20) may have different configurations, and be made of different materials, depending on requirements of a particular application.

Another purpose of the frame (20) is to provide a structure that pivots the idler rollers (40), relative to a stationary member. More specifically, the frame (20) pivots about a pivot point (21), simultaneously about both a vertically axis and a longitudinally aligned axis (i.e., an axis parallel to the direction (L)). In the embodiment shown in FIGS. 1 and 2, the stationary member is a beam (16) of the support frame (14) of the conveyor belt installation. In other embodiments, the stationary member may be a structure dedicated to the attachment of the frame (20), and may or may not be a component of the conveyor belt installation. It is only necessary that the stationary member remain in a fixed position when the system is in use. The frame (20) is pivotally attached to the beam (16) by a pintle ring (22) that is secured to the upper vertex of the frame (20), and that pivots freely on a hook (24) attached to the beam (16). A wedge-shaped bearing member (26a, 26b) is attached to each of the lower vertices of the triangular frame (20). As shown in FIGS. 3A, and 3B, the upper surface of each bearing member (26a, 26b) abuts a vertically-inclined lower guide surface (28a, 28b) of a wedge-shaped guide member, which is stationary in respect to the conveyor belt installation. The interface between the bearing members (26a, 26b) and the guide surfaces (28a, 28b) orients the frame (20) at an angle below the horizontal plane. Accordingly, referring back to FIG. 2, the frame (20) pivots about the axis (A), which is vertically inclined from the longitudinal direction (L) by the elevation angle ($\alpha$). This pivoting motion can be resolved into a rotational component about the vertical axis (V), which can be considered a "yaw" component. In this embodiment, the elevation angle ($\alpha$) is about 60 degrees. When the frame pivots from a first position shown in FIGS. 3A and 4A to a second position shown in FIGS. 3B and 4B, the inclined guide surface (28a) directs the bearing member (26a) to a lower elevation, while the inclined guide surface (28b) directs the bearing member (26b) to a higher elevation. Accordingly, the pivoting motion simultaneously causes the frame (20) to pivot about the pivot point (21), about a longitudinally aligned axis. This component of the pivoting motion can be considered a "roll" component.

In other embodiments, the pivotable attachment of the frame (20) relative to the stationary member of the conveyor belt installation may be achieved using other suitable types of attachments known in the art, non-limiting examples of which may include a ball joint. In other embodiments, the elevation angle ($\alpha$) may be different (e.g., greater than 0 degrees, and less than 90 degrees). In other embodiments, the guide member and the guide surface may have a form that is different than a planar wedge. For example, the guide surface may be contoured in a curvilinear (non-planar) manner to achieve the pivoting effect described above. In other embodiments, the frame may be engaged by a fewer or greater number of guide surface(s), to achieve the pivoting effect described above.

Idler Rollers.

A purpose of the idler rollers (40) is to collectively provide a rolling contact surface that can apply a force to the conveyor belt (10) to correct misalignment of the conveyor belt (10), while allowing continued travel of the conveyor belt (10) in the longitudinal direction (L). More particularly, the rolling contact surface is concavely-shaped, in a transversely-extending vertical plane, relative to the conveyor belt. As used in describing the rolling contact surface, "concavely-shaped in a transversely-extending vertical plane" refers to the rolling contact surface having a cupping effect in respect to the contacted surface of the conveyor belt (10) in a transversely-extending vertical plane passing through the rolling contact surface. For example, in the embodiment shown in FIG. 1, the rolling contact surface defined by the rollers (40) contacts an upward facing surface of the lower run of the conveyor belt (10). The medial portion of the rolling contact surface disposed transversely between the end portions of the rolling contact surface is positioned vertically upwards from the end portions. As such, the rolling contact surface as a whole has a substantially inverted-U-shape in relation to the contacted surface of the conveyor belt (10), so as to cup the conveyor belt. Conversely, if the rolling contact surface were to contact a downward facing surface of the conveyor belt, then then the rolling contact surface would have a U-shape in relation to the contacted surface of the conveyor belt (10) so as to cup the conveyor belt. A concavely-shaped surface may include a shape that is smoothly curved, or a shape that comprises straight segments arranged in a substantially V-shape or a U-shape configuration. The concave shape of the rolling contact surface allows the idler rollers (40) to "cup" the conveyor belt (10), and apply a desired combination of forces on the conveyor belt (10), as later described.

In the embodiment shown in the Figures, the system has six idler rollers (40) rotatably mounted on the curved axle attached to the frame (20). Each of the idler rollers (40) is substantially cylindrical in shape. The axis of the innermost pair of idler rollers (40) are oriented substantially parallel to the horizontal transverse direction (T), while the two outermost pairs of idler rollers (40) are vertically inclined in respect to the horizontal transverse direction so that they collectively define a concavely-shaped rolling contact surface that has an inverted U-shape in a transversely-extending vertical plane. In the embodiment shown in the Figures, the outer surfaces of the idler rollers (40) are textured with ribs to increase the coefficient of friction between the idler rollers (40) and the conveyor belt (10) so that, in comparison with idler rollers (40) having a smooth surface, the idler rollers (40) transfer forces more effectively to the conveyor belt (10). The outer surface of the idler rollers (40) may be made of any suitable material including, without limitation, rubber.

Actuator.

A purpose of the actuator is to provide a mechanism that applies a force to the frame (20), and thereby causes the frame (20) to pivot about the pivot point (21). In the embodiment shown in the FIG. 1, the actuator comprises the combination of a hydraulic cylinder (60) and a hydraulic pump (62). One end of the hydraulic cylinder (60) is pivotally attached to the frame (20), while the opposite end of the hydraulic cylinder (60) is pivotally attached to a member (not shown) that is stationary with respect to the conveyor belt installation. The pump (62) causes changes in hydraulic fluid pressure in the hydraulic cylinder (60), thereby causing the hydraulic cylinder (60) to linearly extend or retract, and thus push or pull the frame (20) so as to pivot about the pivot point (21). In other embodiments, the actuator may comprise other mechanisms driven by other energy sources such as an electro-mechanical motor, or a pneumatic piston. As used herein, the term "actuator" refers to any mechanical device that converts an energy source to movement. As non-limiting examples, the energy source may be hydraulic, electric, or pneumatic in nature.

Sensor.

A purpose of the sensor (80) is to monitor the amount of the transverse misalignment of the conveyor belt (10). In the embodiment shown in FIG. 1, the sensor (80) is an electro-optical sensor that monitors the position of the edge of the conveyor belt (10). As a non-limiting example, the electro-optical sensor (80) includes a light emitting diode (LED) that transmits incident light rays at or near the edge of the conveyor belt (10), and a photodiode that converts reflected light rays to an electronic signal that varies with the intensity of the reflected light rays, which depends on whether the transmitted light rays were incident on the conveyor belt or another object have distinct optical properties. In other embodiments, the sensor (80) may be any type of suitable sensor known in the art that can be used to generate an electronic signal indicative of the amount of the misalignment. Non-limiting examples include position sensors such as transducers, ultrasonic sensors, laser Doppler sensors, magnetic (Hall Effect) sensors, and radar-based sensors. In certain applications, it may be preferable for the sensor (80) to be a non-contact sensor so as to avoid or minimize problems associated with damage to or fouling of the sensor (80).

Computer.

As used herein, "computer" refers to any electronic device that is capable of processing an electronic signal generated by the sensor (80) to generate an input electronic signal to control the actuator. As non-limiting examples, a computer (100) may include one or more devices commonly referred to as a general purpose computer, a server, a programmable logic controller, a printed circuit board, an integrated circuit, a microcontroller, and the like.

The computer (100) is operatively connected to the sensor (80) and to the actuator. In the embodiment shown in FIG. 1, for example, the computer (100) is operatively connected to the sensor (80) to receive a sensor output signal. Further, the computer (100) is operatively connected to the hydraulic pump (62) to provide the pump with a pump input signal that controls the pump speed, and hence the hydraulic fluid pressure acting on the hydraulic cylinder (60).

A purpose of the computer is to automatically control the actuator to pivot the frame (20) about the pivot point (21) depending on the amount of the transverse misalignment detected by the sensor (80). To this end, in embodiments, the computer may comprise a non-transitory computer readable memory (e.g., magnetic media, optical media, or solid-state semiconductor or integrated circuit) that stores a set of instructions (e.g. an algorithm or set of rules) that determines the input signal to the actuator (60).

In embodiments, the instructions may configure the computer (100) to determine the amount of the misalignment based on the sensor output signal, and control the actuator in real-time, depending on the amount of the misalignment detected by the sensor (80) at an instance in time. In embodiments, the computer may be configured to control the actuator periodically (e.g., every 5 minutes or 10 minutes), depending on an average of the amount of misalignment detected by the sensor (80) at a plurality of instances in time, in a time period. The frequency of the control may be varied in different embodiments of the invention.

In embodiments, the instructions may configure the computer (100) to control the actuator to result in one or more kinematic parameters of the pivoting motion frame (20) that may affect the magnitude, direction, and temporal nature of the forces imparted by the idler rollers (40) on the conveyor belt (10), with a view to reducing the amount of misalignment. As non-limiting examples, these parameters may include one or a combination of the angular displacement, angular speed, and angular acceleration of the pivoting motion.

In embodiments, the instructions may configure the computer (100) to be artificially intelligent in respect to the control of the actuator. That is, the computer in conjunction with the sensor (80), may monitor the corrective effect produced by pivoting of the frame (20) on the misalignment of the conveyor belt (10), and utilize this historical information to "learn" and vary the governing set of instructions, so as to improve the corrective effect of the instructions towards the goal of maintaining alignment, as the system is used over time. As known to persons skilled in the art of artificial intelligence and machine learning, this may be achieved through tools such as artificial neural networks, and probabilistic algorithms.

Use and Operation.

To use the invention, the sensor (80) monitors the amount of misalignment of the conveyor belt (10) when it is in motion, and generates a sensor output signal to the computer that is indicative of the amount of the misalignment. Based on the sensor (80) output signal, the computer (100) executes the stored set of instructions to determine an actuator input signal to control the actuator, and thus pivot the frame (20) while the conveyor belt (10) is moving in the longitudinal direction. In the embodiment shown in FIG. 1, for example, the computer (100) may control the speed of the hydraulic pump (62) to effect the amount and rate of extension or retraction of the hydraulic cylinder (60) to achieve certain kinematic parameters for the pivoting motion of the frame (20).

Figure 4A:
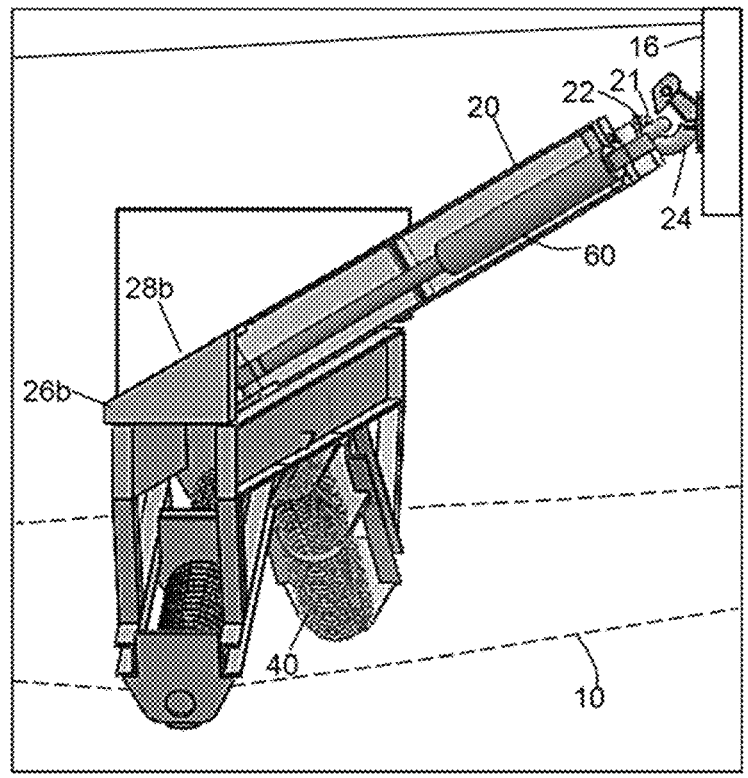
FIG. 4A is a side view of the apparatus shown in FIG. 2, in relation to the conveyor belt installation.
Figure 4B:
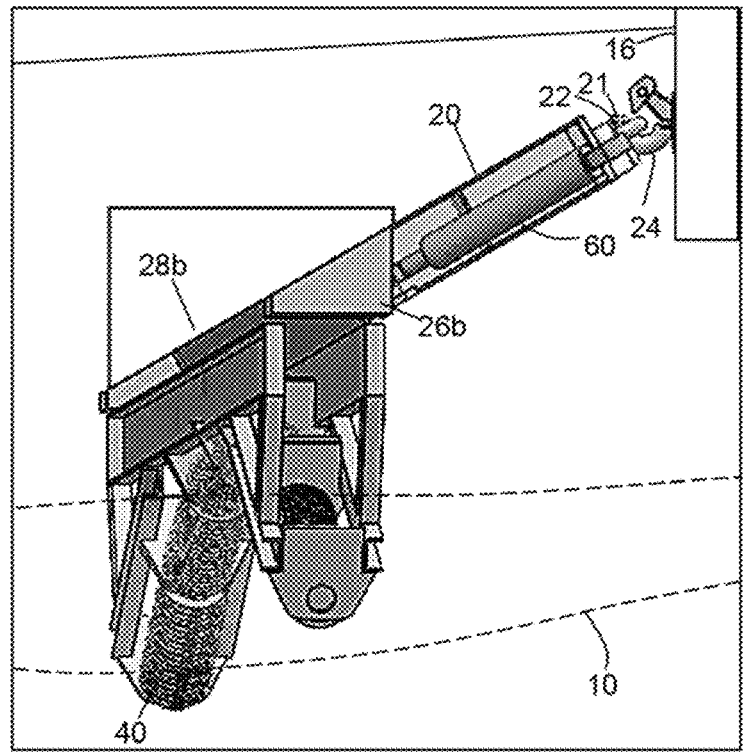
FIG. 4B is a side view of the apparatus shown in FIG. 4A, when in a different position than shown in FIG. 4A.
Figure 5:
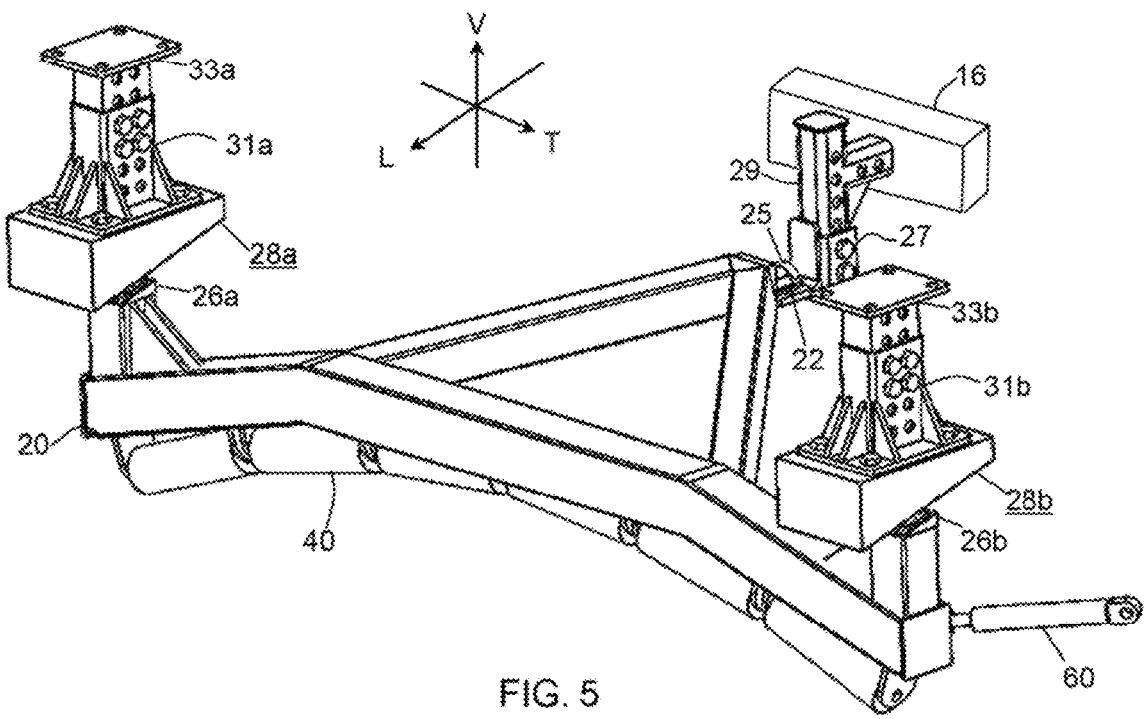
FIG. 5 shows a front perspective view of a second embodiment of an apparatus of the present invention, in isolation from a conveyor belt installation.
Figure 6:
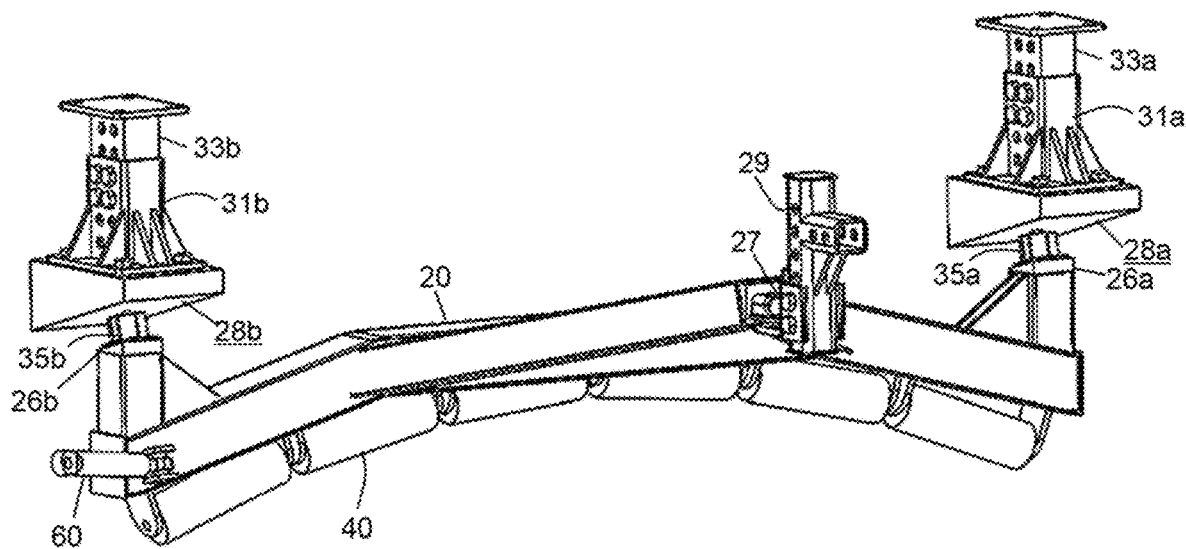
FIG. 6 shows a rear perspective view of the apparatus shown in FIG. 5.
Figure 7:
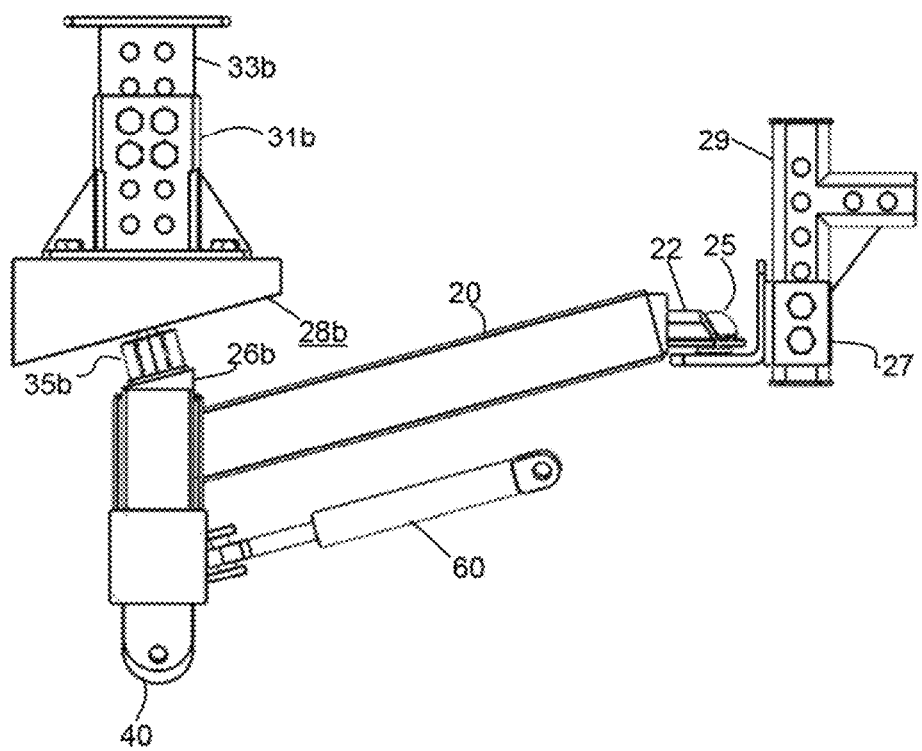
FIG. 7 shows a side view of the apparatus shown in FIG. 5.
Figure 8:
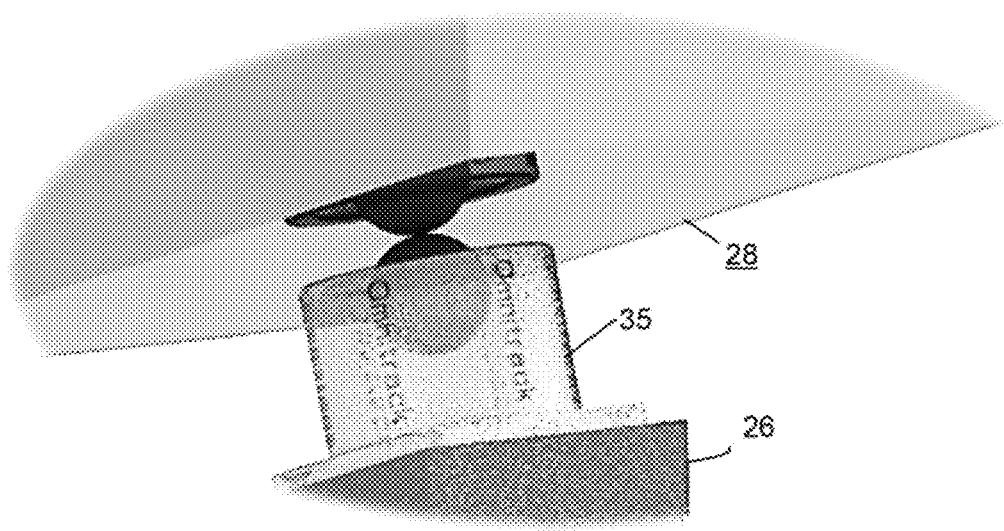
FIG. 8 shows a perspective view of a ball transfer unit and guide surface of the apparatus shown in FIG. 5.

FIGS. 3A and 4A show the frame (20) when fully pivoted in the clockwise direction (as viewed from a downward-looking perspective in FIG. 3A) that is associated with full extension of the hydraulic cylinder (60). In comparison, FIGS. 3B and 4B show the frame (20) when fully pivoted in the counter-clockwise direction (as viewed from a downward-looking perspective in FIG. 3B) that is associated with full retraction of the hydraulic cylinder (60). As a result of the pivoting motion of frame (20), the right-most end of the frame (20) moves simultaneously longitudinally forward, transversely leftward, and vertically upward, when pivoting from the position shown in FIGS. 3A and 4A to the position shown in FIGS. 3B and 4B. Consequently, pivoting movement of the frame (20) causes the idler rollers (40) to apply forces to the conveyor belt (10) that result in three simultaneous effects as illustrate in FIGS. 3A and 3B: first, a transverse pushing effect, as denoted by the arrow (P), that "shoves" the conveyor belt (10) in the transverse direction relative to the end pulley (12); second, a torsional steering effect, as denoted by the curved arrow (S), that steers the conveyor belt (10) in the horizontal plane relative to the end pulley (12); and third, a torsional tilting effect relative to the end pulley (12), as denoted by the curved arrow (W), that tends to reduce tension on one transverse edge of the conveyor belt (10), while increasing tension on the opposite transverse edge of the conveyor belt (10). The transverse pushing effect (P) and the torsional steering effect (S) are primarily attributable to the "yaw" component of the pivoting motion of the frame (20), while the torsional tiling effect (W) is primarily attributable to the "roll" component of the pivoting motion of the frame (20). The combination of these effects in concert with each other may correct the transverse misalignment of the conveyor belt (10) more effectively than any of these effects in isolation.

Second Embodiment

FIGS. 5 to 9 show a second embodiment of the apparatus of the present invention, in isolation from the conveyor belt installation. The second embodiment of the system is similar to the first embodiment of the system shown in FIGS. 1 to 4B, with like elements being labelled with like reference characters. Accordingly, the following description focuses on certain differences of the second embodiment and its use and operation, as compared with the first embodiment.

In this second embodiment, the bearing members (26a, 26b) of the frame (20) do not directly engage the guide surfaces (28a, 28b). Rather, a rolling element a ball transfer unit (35a, 35b) is attached to each of the bearing members (26a, 26b). As shown in one embodiment in FIG. 8, the ball transfer unit (35a, 35b) includes a housing that contains a ball supported by bearings (concealed from view in the housing) that allow the ball to rotate relative to the housing in multiple directions, while transmitting load. Such ball transfer units are described in UK patent GB 2493370, and available under the tradename Omnitrack™ (Omnitrack Ltd., Stroud, United Kingdom). As the frame (20) pivots, the balls will roll in an arcuate path along the guide surfaces (28a, 28b). In other embodiments, instead of a ball, the rolling element may be a wheel rotatably mounted to the frame. For example, the wheel may be mounted to the frame (20) by an attachment like a swivel caster that allows the wheel to roll in multiple directions on the guide surfaces (28a, 28b) as the frame (20) pivots in relation to the guide surfaces (28a, 28b).

In this second embodiment, the pivotal attachment of the frame (20) to the stationary member of the conveyor belt installation uses a pintle ring (22) secured to an upper vertex of the frame (20). The pintle ring (22) pivots on a ball (25) rather than on a hook. Moreover, the ball (25) is secured to a mounting bracket (27). The mounting bracket (27) receives a post (29) that is secured to the stationary member in the form of beam (16). The vertical position of the ball (25), and hence the vertical position of the pivot point of the frame (20), can be adjusted by sliding the mounting bracket (27) relative to the post (29) to selectively align bolt apertures defined by them.

Figure 9A:
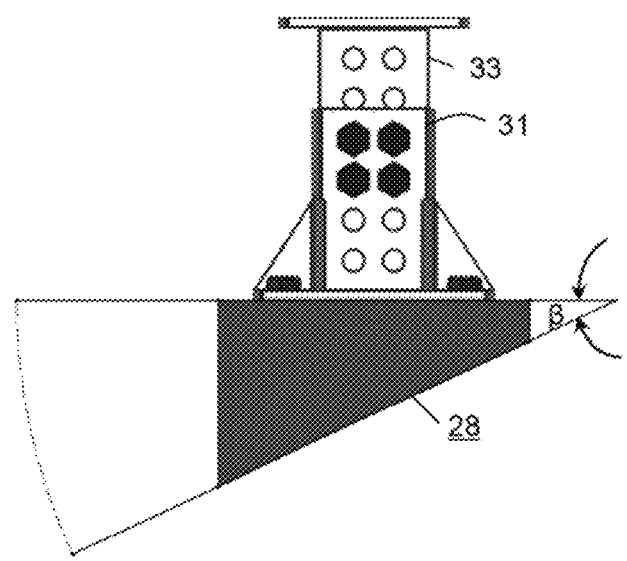
FIG. 9A shows a side view of a guide member assembly of the apparatus shown in FIG. 5, with a first guide surface.
Figure 9B:
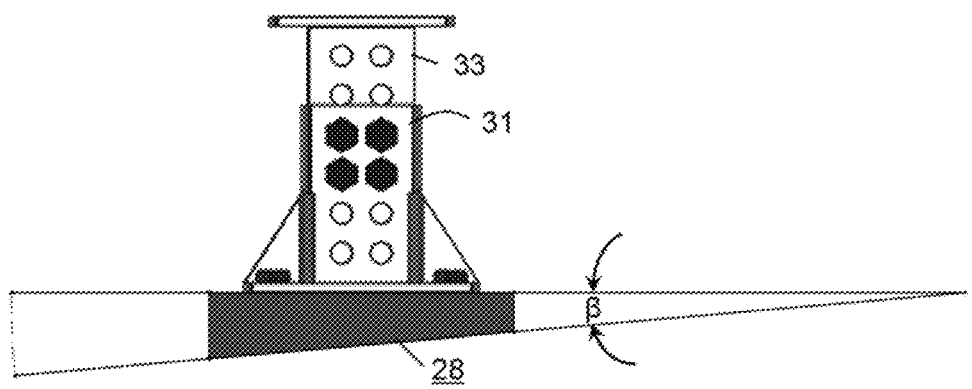
FIG. 9B shows a side view of a guide member assembly similar to that of FIG. 9A, with the first guide surface of FIG. 9A interchanged with a second guide surface having an angle of inclination that is different from the angle of inclination of the first guide surface of FIG. 9A.

FIGS. 9A and 9B show guide member assemblies of this second embodiment. In this second embodiment, the wedge-shaped guide members that define the guide surfaces (28) are secured to mounting brackets (31a, 31b). The mounting brackets (31a, 31b) receive posts (33a, 33b) that are secured to a stationary member of the conveyor belt installation. The vertical positions of the guide surfaces (28) can be adjusted by sliding the mounting brackets (31a, 31b) relative to the post (31) to selectively align bolt apertures defined by them.

In this second embodiment, the wedge-shaped guide members are removably secured to the mounting brackets (31), such as by bolts. This allows the inclination angle (β) of the guide surfaces (28) to be modified, by interchanging one guide member with another guide member. For example, a guide member having an inclination angle (β) of about 25 degrees as shown in FIG. 9A, may be detached from the mounting bracket (31) and replaced with a guide member having an inclination angle (β) of about 5 degrees as shown in FIG. 9B. In embodiments, the system may be supplied with a kit of guide members having different inclination angles (β) within a range of about 5 degrees to 30 degrees. In other embodiments, the different guide members may more generally have a guide surface of differing geometry (e.g., one or a combination of inclination angle, contour, or position) from each other so that they can be used to guide pivoting of the frame (20) in different paths.

Accordingly, the vertical position of the pivot point of the frame (20), the vertical position of the guide surfaces (28) and the inclination angle (β) of the guide surfaces (28) may be adjusted to vary the vertical position of the idler rollers (40) relative to the conveyor belt (10), as well as the elevation angle (α). By doing so, the magnitude of the transverse pushing effect (P), the torsional steering effect (S), and the torsional steering effect (W) imparted by the idler rollers (40) to the conveyor belt (10) may be adjusted. These adjustments may be made upon initially setting up the system, or afterwards, to tune the performance of the system depending on operating conditions such as the loading on the conveyor belt (10) or the tension of the conveyor belt (10).

Third Embodiment

Figure 10:
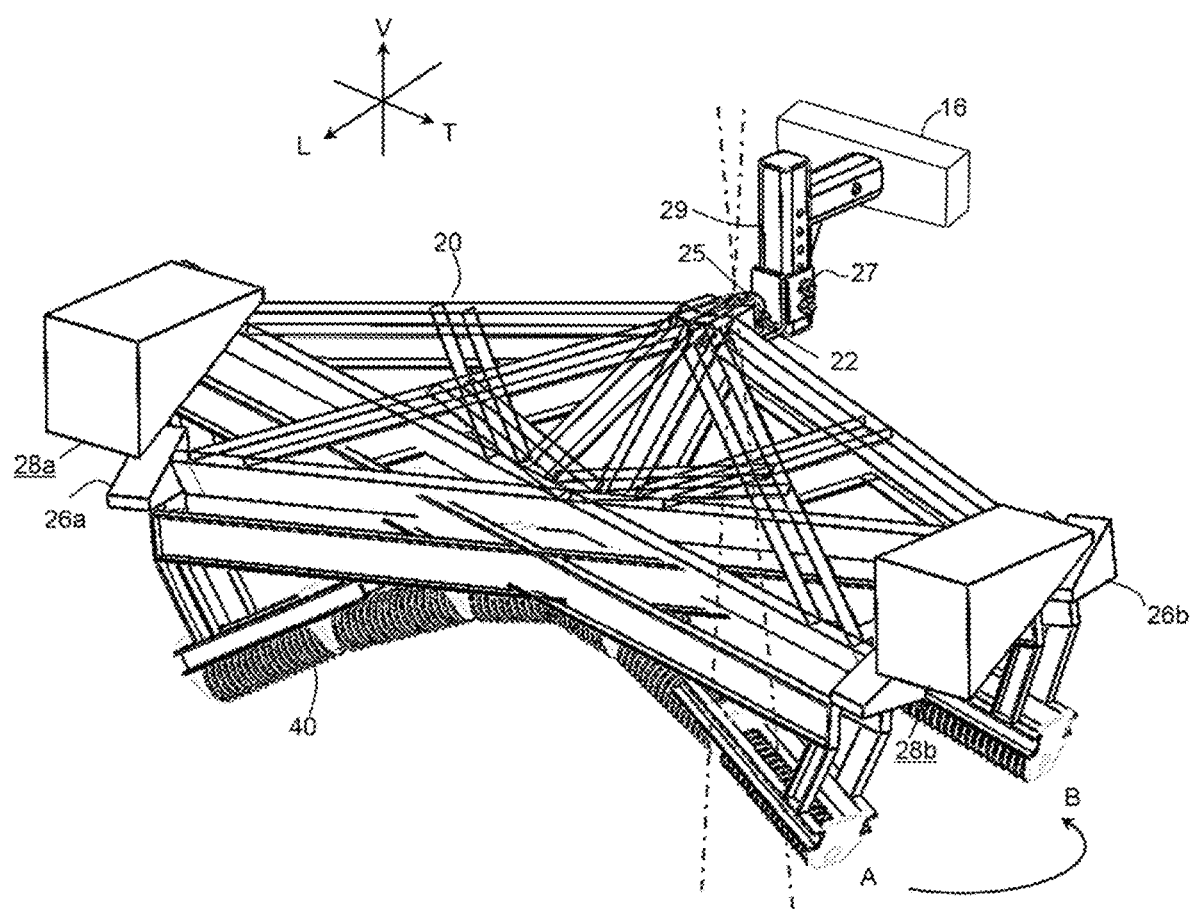
FIG. 10 shows a perspective view of a third embodiment of apparatus of the present invention, when in two different positions.
Figure 11:
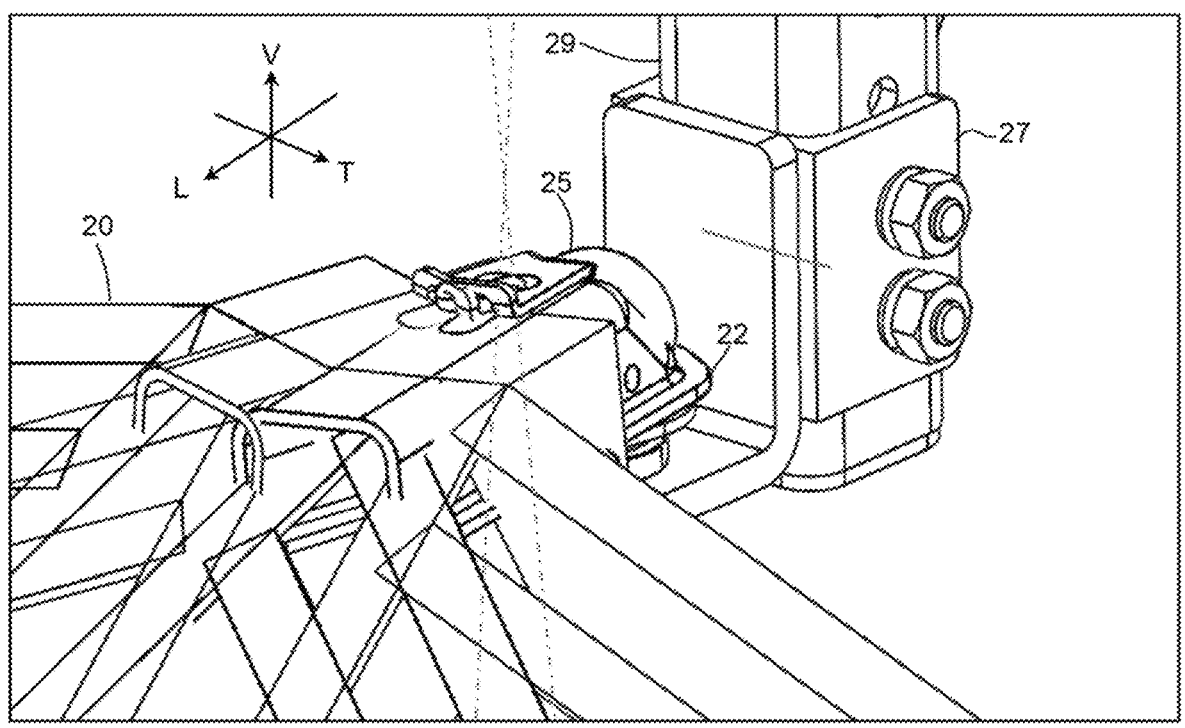
FIG. 11 shows a detailed view of the pivot point of the apparatus shown in FIG. 10, when in two different positions.

FIGS. 10 and 11 show a third embodiment of the apparatus of the present invention, in isolation from the conveyor belt installation. The third embodiment of the system is similar to the first and second embodiments of the system, with like elements being labelled with like reference characters.

FIG. 10 shows the frame (20) pivoting from a neutral position (A) to a non-neutral position (B). (In FIG. 10, the neutral position (A) and the non-neutral position (B) are superimposed on each other for illustrative effect.) In the neutral position, the rolling contact surface provided by the idler rollers (40) is disposed symmetrically in relation to a properly aligned conveyor belt, so that the transverse pushing effect (P), the torsional steering effect (S) and the torsional tiling effect (W) are substantially nil. FIG. 11 shows a detailed view of the region of the apparatus near the pivot point, when the frame (20) pivots from the neutral position to the non-neutral position. (In FIG. 11, the neutral position and the non-neutral position are superimposed on each other for illustrative effect.) This figure illustrates the combined "yaw" and "roll" components of the pivoting motion of the frame (20) as it moves from the neutral position to the non-neutral position. Relative to the neutral position, in the non-neutral position, the frame (20) has simultaneously rotated about a vertical axis, and tilted about a longitudinally aligned axis so that the rolling contact surface imparts the combined transverse pushing effect (P), torsional steering effect (S) and torsional tiling effect (W) on the conveyor belt.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A system for correcting a misalignment of a conveyor belt travelling in a horizontal longitudinal direction relative to a stationary member, the misalignment occurring relative to a pulley supporting the conveyor belt, and in a horizontal transverse direction perpendicular to the longitudinal direction, wherein the conveyor belt comprises a conveyor belt portion above the pulley and a conveyor belt portion below the pulley, the system comprising:
- (a) a rigid frame pivotally attached at a pivot point to the stationary member;
- (b) at least one stationary guide surface that, directly or indirectly, engages the rigid frame to guide pivoting of the frame about the pivot point, simultaneously about a vertical axis and a longitudinally aligned axis; and
- (c) a plurality of idler rollers rotatably mounted on the frame and collectively defining a rolling contact surface for engaging only a top surface of the conveyor belt portion below the pulley, wherein the contact surface is concavely-shaped in a transversely-extending vertical plane, and spaced apart from the pivot point.

2. The system of the claim 1, wherein the pivot point is adjustable in respect to its vertical position relative to the conveyor belt.

3. The system of claim 1, where the at least one guide surface comprises a pair of transversely spaced apart, vertically inclined, guide surfaces.

4. The system of claim 1, wherein the guide surface is adjustable in respect to its vertical position relative to the conveyor belt.

5. The system of claim 1, wherein the guide surface is removably attached to a guide member assembly so as to be interchangeable with a replacement guide surface having a different geometry than the guide surface, such that the guide surface and the replacement guide surface guide pivoting of the frame about the pivot point in different paths.

6. The system of claim 1, wherein the system further comprises a rolling element rotatably mounted to the rigid frame, wherein the guide surface indirectly engages the frame to guide pivoting of the frame via rolling contact of the rolling element with the guide surface.

7. The system of claim 1, further comprising an actuator for pivoting the frame about the pivot point.

8. The system of claim 7, wherein the actuator comprises a hydraulic actuator.

9. The system of claim 7, further comprising a sensor for monitoring the misalignment, and a computer operatively connected to the sensor and to the actuator, and configured to:
- (a) determine an amount of the misalignment based on a signal from the sensor; and
- (b) automatically control the actuator to pivot the frame about the pivot point depending on the determined amount of the misalignment.

10. The system of claim 9, wherein the sensor comprises an electro-optical sensor.

11. The system of claim 9, wherein the sensor monitors the misalignment by monitoring the position of an edge of the conveyor belt.

12. The system of claim 9, wherein the computer is configured to control the actuator in real-time depending on the determined amount of the misalignment at an instance in time.

13. A method for correcting a misalignment of a conveyor belt travelling in a horizontal longitudinal direction relative to a stationary member, the misalignment occurring relative to a pulley supporting the conveyor belt, and in a horizontal transverse direction perpendicular to the longitudinal direction, wherein the conveyor belt comprises a conveyor belt portion above the pulley and a conveyor belt portion below the pulley, the method comprising the steps of:
- (a) placing a rolling contact surface in contact with only a top surface of the conveyor belt portion below the pulley, wherein the rolling contact surface is collectively defined by a plurality of idler rollers, and wherein the rolling contact surface is concavely-shaped in a transversely-extending plane; and
- (b) when the rolling contact surface is in contact with the conveyor belt and the conveyor belt is travelling in the longitudinal direction, pivoting the rolling contact surface, relative to the stationary member, about a pivot point spaced apart from the rolling contact surface, simultaneously about a vertical axis and a longitudinally aligned axis.

14. The method of claim 13, wherein the method further comprises adjusting one or a combination of a vertical position of the pivot point relative to the conveyor belt, or an angle of inclination of the rolling contact surface relative to the conveyor belt.

15. The method of claim 13, wherein the pivoting step is performed using an actuator to apply a force to a frame on which the plurality of idler rollers are rotatably mounted.

16. The method of claim 15, wherein the actuator comprises a hydraulic actuator.

17. The method of claim 15, wherein:
- (a) the method further comprises using a sensor to monitor the misalignment; and
- (b) in the pivoting step, the actuator is automatically controlled by a computer operatively connected to the sensor and to the actuator, and configured to determine an amount of the misalignment based on a signal from the sensor, and to control the actuator to pivot the frame about the pivot point depending on the determined amount of the misalignment.

18. The method of claim 17, wherein the sensor comprises an electro-optical sensor.

19. The method of claim 17, wherein the sensor monitors the misalignment by monitoring the position of an edge of the conveyor belt.

20. The method of claim 17, wherein the computer is configured to control the actuator in real-time, depending on the determined amount of the misalignment at an instance in time.

* * * * *